United States Patent [19]

Clough et al.

[11] Patent Number: 4,496,242

[45] Date of Patent: Jan. 29, 1985

[54] APPARATUS FOR POSITIONING A CONTACT LENS UNDER A RADIUSCOPE

[75] Inventors: John Clough, Clearwater; Henry H. Hollidge, Seminole, both of Fla.

[73] Assignee: Automated Optics, Inc., Clearwater, Fla.

[21] Appl. No.: 333,261

[22] Filed: Dec. 22, 1981

[51] Int. Cl.³ .............................................. G01N 21/01
[52] U.S. Cl. ..................................... 356/244; 356/124
[58] Field of Search ............... 356/244, 124, 125, 127, 356/30, 31; 350/529, 530, 531, 532

[56] References Cited

U.S. PATENT DOCUMENTS 3,274,885  9/1966  Rocher et al. ...................... 356/237

OTHER PUBLICATIONS

Hacker, "Micro-Power", catalogue of micromanipulators, Hacker Instruments, Inc., 11/72.

*Primary Examiner*—F. L. Evans
*Assistant Examiner*—Matthew W. Koren
*Attorney, Agent, or Firm*—Burns, Doane, Swecker & Mathis

[57] ABSTRACT

A device for positioning the curved surface of a lens beneath a radiuscope provides a variable distance between the lens surface and a pivot point for the lens to thereby accommodate lenses having different curvature radii. The device includes a pair of X- and Y-axis slides for providing adjustment of the lens in a horizontal plane. A first Z-axis slide connected to the X- and Y-axis slides enables the height of the lens relative to the radiuscope to be varied. A second Z-axis slide is pivotably attached to the first Z-axis slide. The lens to be examined is accommodated in a lens holder that is attached to the second Z-axis slide. Movement of the second slide along its translational axis varies the distance between the lens and the pivot point for the slide. Once this distance is set to a value equal to the radius of curvature of the lens being examined, the second slide can be rotated about its pivot point to enable the entire surface of the lens to be examined under the radiuscope without the need to refocus the scope upon repositioning of the lens.

5 Claims, 5 Drawing Figures

APPARATUS FOR POSITIONING A CONTACT LENS UNDER A RADIUSCOPE

BACKGROUND OF THE INVENTION

The present invention relates to the measurement and analysis of lens surfaces, and in particular to a device for accurately positioning a lens under a radiuscope to enable the entire contour of the lens to be examined and the radius of the lens curvature to be accurately measured.

A radiuscope is a well known optical device that is typically found in most contact lens manufacturing laboratories. One such device is manufactured and sold by the American Optical Company. The principle operation that is performed with a radiuscope is the measurement of the radius of curvature of the contact lens surfaces. In operation, the contact lens is placed in a holder located beneath the radiuscope in a position to reflect rays of light generated within the scope. The reflected light rays impinge upon a focusing screen that is viewed by the scope operator.

The curved surface of the lens causes the reflected light rays to produce an interference fringe pattern on the focusing screen. The operator can move the focusing screen toward or away from the lens to bring the observed image of the fringe pattern into sharp focus. This image can be centered on the screen with the aid of reference lines generated within the radiuscope. Once the image has been brought into focus, the operator notes the reading of an indicator on a calibrated scale that is also visible within the scope and relates to the position of the focusing screen. Thereafter, the focusing screen is moved in one direction, either toward or away from the lens, causing the fringe pattern to go out of focus. The movement of the screen is continued until the fringe pattern again comes into sharp focus. The operator again notes the reading of the indicator on the scale, which provides a measurement of the distance the screen was moved between the two focus positions.

The distance that the focusing screen must be moved to go from one focus position to the next is a function of the wavelength of light reflected by the contact lens and the radius of curvature of the lens surface. Since the light wavelength is a known quantity, the radius of curvature can be easily calculated. Preferably, the scale that is visible within the radiuscope is calibrated in units of measurement related to the radius of curvature.

One of the limitations associated with a standard radiuscope is the restricted area of view that it offers during a measurement step. More specifically, the light beam generated by the scope covers a spot on the lens surface that is approximately 3 millimeters in diameter. A typical contact lens might be 7–15 millimeters in diameter. Consequently, the radiuscope only enables a relatively small portion of the central area of the lens to be analyzed. In order to measure the radius of curvature of other portions of the lens surface, for example near the periphery, it is necessary to place the lens on an adapter that enables the lens to be positioned at different orientations with respect to the beam of light produced by the scope. The adapter basically comprises a ball and socket type of arrangement. The radius of curvature of the ball is typically not the same as the curvature of a lens surface. Therefore, it is necessary to readjust the position of the focusing screen each time that a different spot on the lens is to be checked. The requirement for such readjustment upon each repositioning of the lens greatly hinders any attempt to make a continuous examination of the lens surface along a diametric line, for example, to locate flaws or the like that would not affect the interference fringe pattern.

OBJECTS OF THE INVENTION

Accordingly, it is a general object of the present invention to provide a novel device for accurately positioning a contact lens under a radiuscope.

It is another object of the present invention to provide such an apparatus that enables the contact lens to be moved under the scope along a diametric line to facilitate a continuous measurement of radius of curvature and examination of the surface of the lens from one side of lens to the other, including the edge characteristics, without the need to readjust the scope as the lens position is changed.

It is a further object of the present invention to provide a novel apparatus for use in conjunction with a radiuscope that provides an adjustable radius of curvature for the repositioning of a contact lens, to thereby adapt the apparatus to be used with a variety of different sizes of contact lenses.

It is yet another object of the present invention to provide a novel apparatus for use with a radiuscope that facilitates the examination of contact lenses whose geometric surface configuration comprise a plurality of curvature radii.

In order to facilitate an understanding of the present invention and the manner in which it achieves the foregoing objects and advantages, a preferred embodiment thereof is illustrated in the accompanying drawings and described in detail hereinafter.

DETAILED DESCRIPTION

Figure 1:
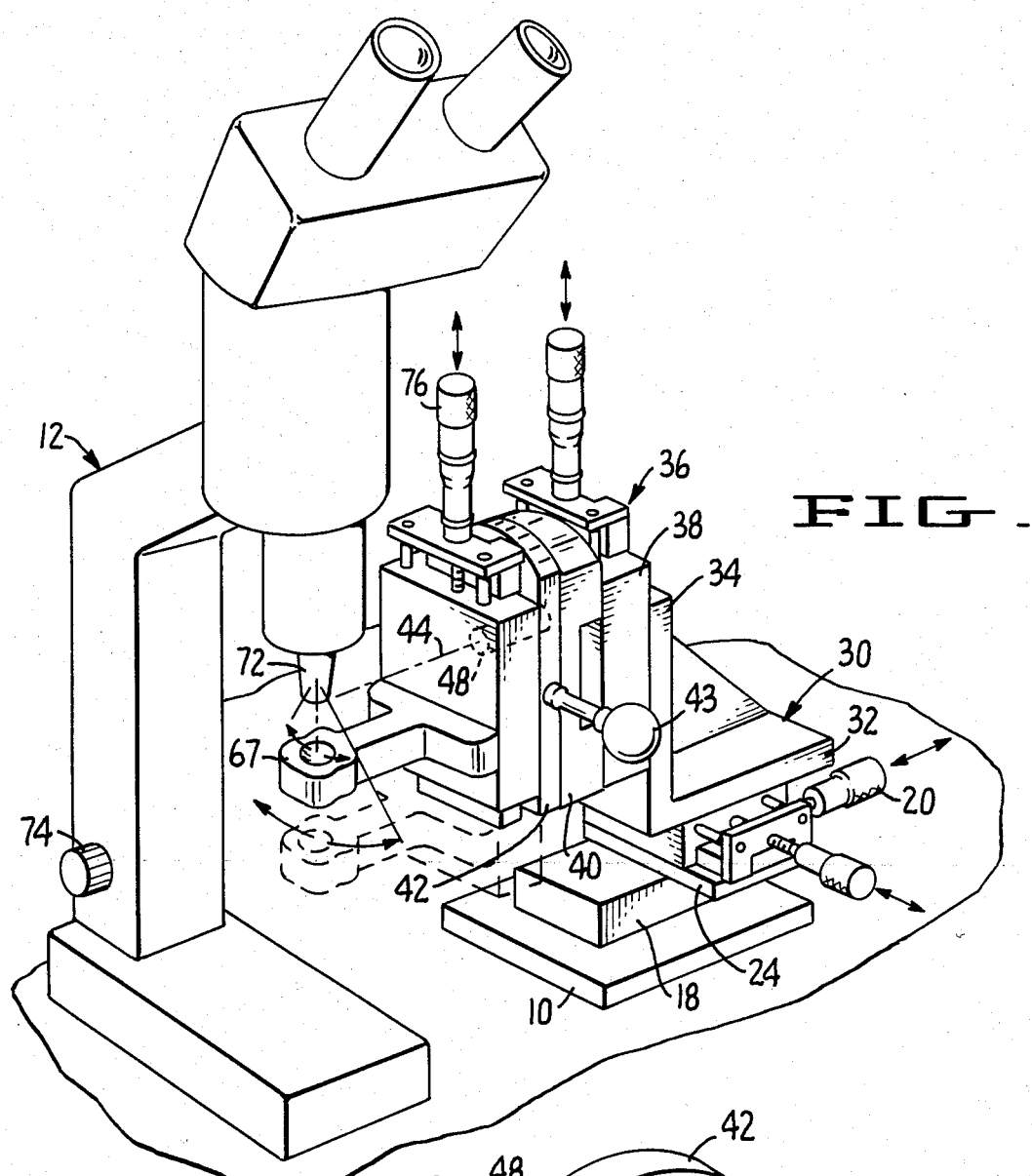
FIG. 1 is a perspective view of a radiuscope and a lens surface analyzing apparatus constructed in accordance with the present invention placed in an operative position relative to the radiuscope.

In the following detailed description of a preferred embodiment of the invention, it is discussed with particular reference to its use in connection with the examination of the optical surfaces on a contact lens where such discussion facilitates an understanding of the invention. However, it will be appreciated by those of ordinary skill in the art that the invention is not limited to this particular use, but has general applicability to any situation in which it is desirable to examine a spherical, or otherwise curved, surface without having to reposition a support for the object on which the surface is located to accommodate a change in radius or the viewing distance to the surface.

Referring to the accompanying drawings, the lens supporting device constructed in accordance with the present invention includes a stationary base 10 that is fixedly attached to a suitable support surface, such as the surface on which a radiuscope 12 rests. A first linear stage 14 is attached to the base 10. The linear stage can be any suitable conventional device for providing accurate linear translation along an axis. It includes a stationary portion 16 and a movable portion 18. The movable portion 18 is translated along a horizontal axis relative to the stationary portion 16 by means of a rotatable knob 20 attached to a threaded shaft 22 that cooperates with threads (not shown) within the movable portion 18. A subplate 24 is mounted on the movable portion 18 of the first linear stage 14 and supports a second linear stage 26 that is similar to the first stage 14. However, the second linear stage 26 is disposed so that the horizontal axis along which its movable portion 28 translates is perpendicular to the translational axis of the first linear stage 14. The first and second linear stages 14 and 26 can be respectively referred to as X axis and Y axis stages.

An angle plate 30 is mounted on the movable portion 28 of the second linear stage 26. The angle plate includes a horizontal portion 32 that is mounted on the second linear stage and an upright portion 34 that provides a substantially vertical surface. A third linear stage 36 is fixedly attached to the upright portion 34. The third linear stage 36 is oriented so that its movable portion 38 translates along a vertical axis, which can be referred to as the Z axis.

Figure 2:
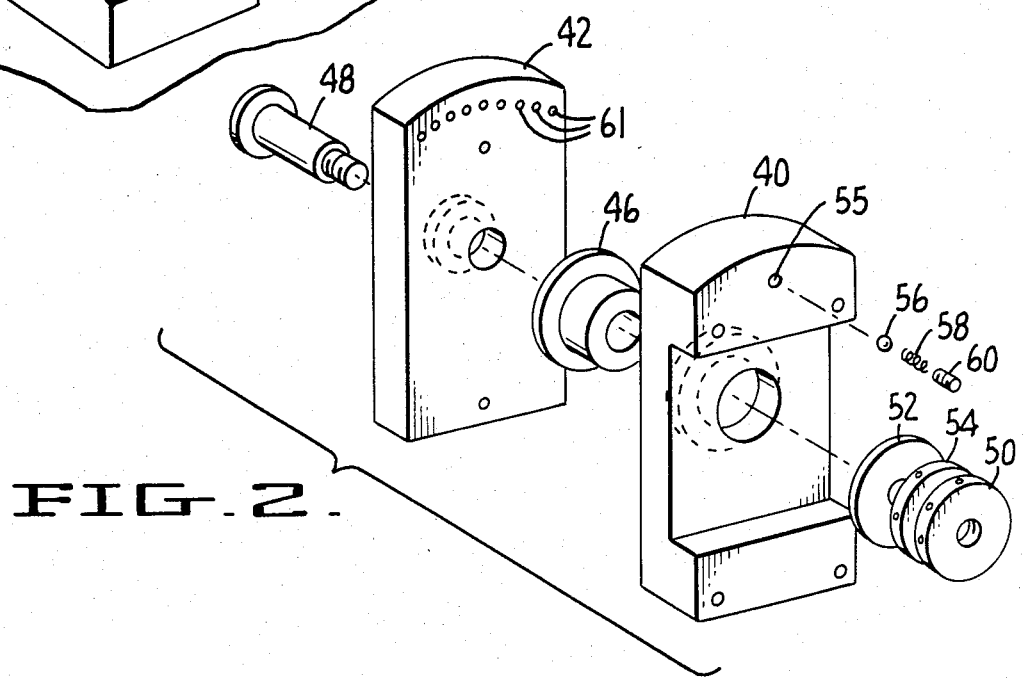
FIG. 2 is an exploded view of the pivotal assembly for the pivot plate.
Figure 4:
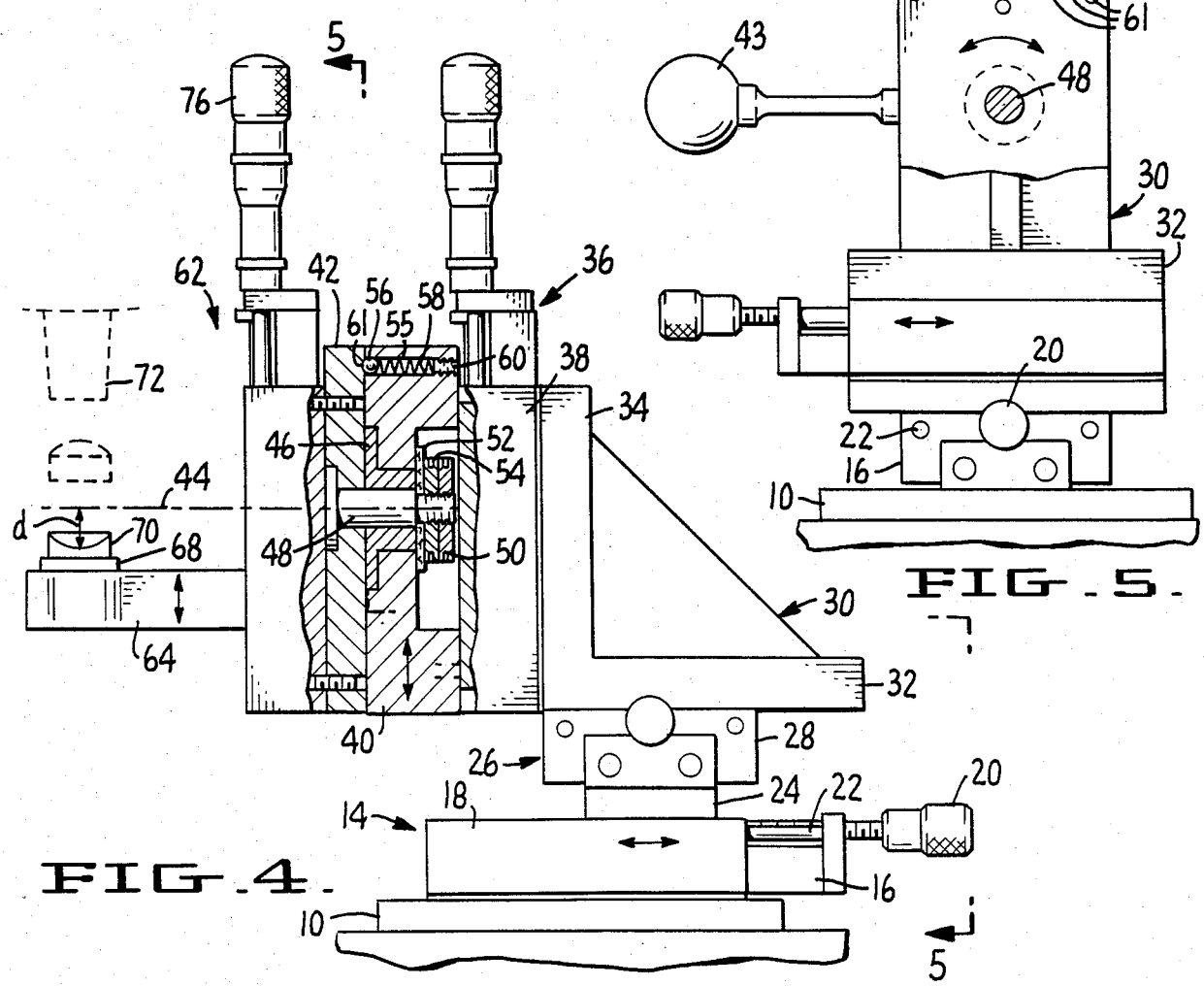
FIG. 4 is a side view, partly in section, of the lens surface analyzing apparatus of the present invention, with portions of a radiuscope being shown in phantom.

A bearing plate 40 is fixedly secured to the movable portion 38 of the third linear stage 36. A pivot plate 42 is attached to the bearing plate 40 so as to be pivotable in a vertical plane about a horizontal pivot axis 44. Referring particularly to FIGS. 2 and 4, the pivotable attachment for the pivot plate 42 includes a bearing 46 inserted in a recess in the bearing plate 40, a pivot pin 48 that passes through an aperture in the pivot plate 42 and the bearing 46, a nut 50 secured to the end of the pivot pin 48 that is remote from the pivot plate 42, and a friction washer 52 disposed between the nut 50 and the rear surface of a recess in the rear side of the bearing plate 40. An additional bushing or washer 54 can be inserted between the nut 50 and the friction washer 52, if desired.

The bearing plate 40 includes a bore 55 near the upper end thereof that houses a detent mechanism including a ball bearing 56, a spring 58 and an adjustable set screw 60 for biasing the ball bearing 56 into engagement with the surface of the pivot plate 42 that opposes the bearing plate 40. This surface of the pivot plate 42 preferably has a number of detents spaced 61 therealong near the top edge of the plate for cooperation with the spring biased ball bearing 56 to maintain the pivot plate 42 in one of a number of selected angular positions. For example, the detents can be provided in the mounting plate at 10° spacings relative to the pivot axis 44. A suitable handle 43 can be attached to the pivot plate 42 to facilitate movement of the plate about the pivot axis 44.

Figure 3:
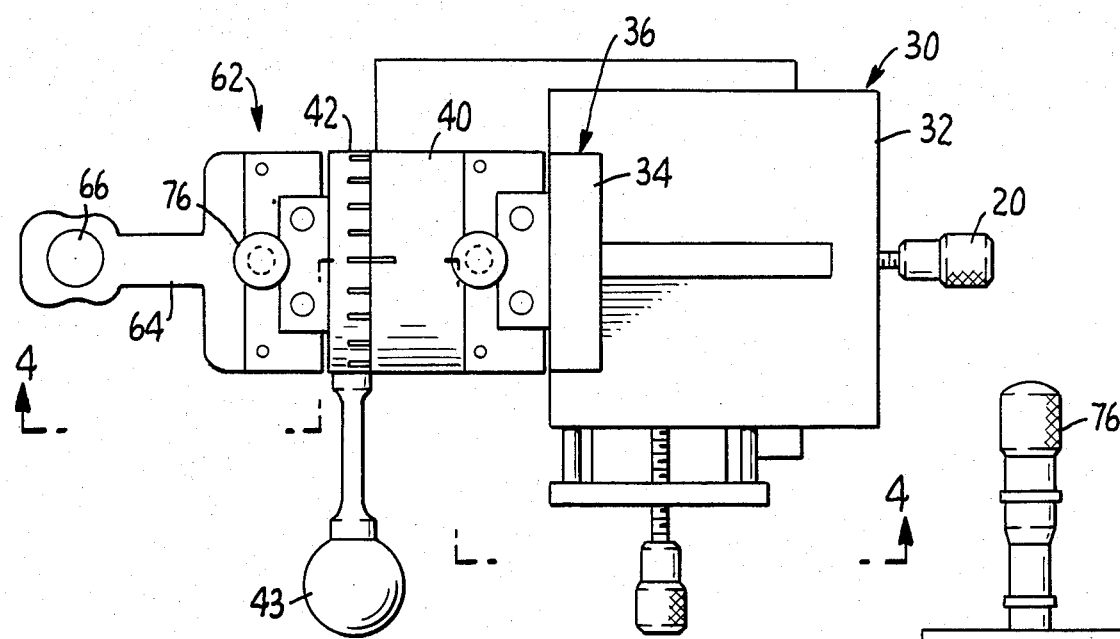
FIG. 3 is a plan view of the lens surface analyzing apparatus.
Figure 5:
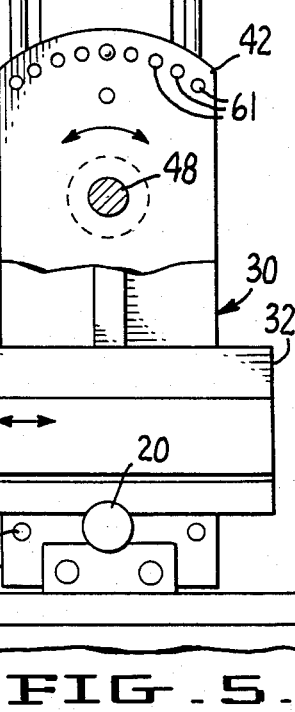
FIG. 5 is an end view, partly in section, of the lens analyzing apparatus.

A fourth linear stage 62 is fixedly attached to the pivot plate 42. The linear stage 62 is disposed with its axis of translation perpendicular to the pivot axis 44, and hence parallel to that of the third linear stage 36 when it is vertically disposed as illustrated in FIGS. 1, 3 and 5. In other words, it forms a second Z axis stage. A cantilevered lens support arm 64 is attached to the movable portion of the linear stage 62. The remote end of the arm 64 includes an aperture 66 for accommodating a pitch block 68 or other suitable form of lens support block. The lens, or a partially finished lens block, 70 is mounted on the pitch block 68, for example by means of an adhesive. The fourth linear stage 62 enables the distance d between the pivot axis 44 and the curved surface of the lens block 70 to be varied in accordance with the radius of curvature of that surface.

In operation, the surface analyzing device is placed in position with the lens support arm 64 disposed relative to a radiuscope as illustrated in FIGS. 1 and 4, to thereby position the lens 70 supported in the arm 64 in operative relationship with the observation lens 72 of the scope. When the scope is energized, it generates a beam of light that impinges upon the lens surface in an area that is approximately 3 millimeters in diameter. The first step to be performed in the operation of the scope is to align the lens in a horizontal plane with reference marks disposed on the view finder of the scope to thereby center the beam of light on the lens. This alignment can be carried out by adjusting the horizontal position of the lens with the X axis and Y axis stages 14 and 26. Once the lens is so positioned, the fringe pattern generated by reflection of the light beam from the curved surface must be focused on the focusing screen of the scope. In the past, this was typically done by adjusting the height of the scope observation lens 72 relative to the fixed lens under examination until the fringe pattern was focused, for example by means of a knob 74 on the scope. Then a reading was made of an indicator on a scale observable on the focusing screen. However, in order to facilitate the reading of the scale, and hence measurement of the radius of curvature of the lens, the present invention enables the height of the lens being examined, rather than the height of the radiuscope lens 72, to be adjusted by means of the first Z axis stage 36. Thus, it is possible to set the indicator on the scale at a suitable reference point, such as 0, and then adjust the height of the lens until the fringe pattern comes into focus at this reference point.

Once the fringe pattern is brought into focus at the desired reference point, the operator adjusts the height of the radiuscope lens 72 until the fringe pattern goes out of focus and comes back into focus once again. A reading is then taken from the scale observable within the scope. The difference between this reading and the reading of the scale at the initial reference point provides an indication of the radius of curvature of the lens surface. Once this radius of curvature is known, the second Z axis slide 62 can be adjusted so that the distance d between the pivot axis 44 and the curved lens surface is equal to this radius of curvature. For this purpose, the adjusting knob 76 for the second Z axis slide 62 is preferably calibrated in units related to the distance between the pivot axis 44 and the lens surface. This feature can be easily provided when the lens support block 68 is fabricated so that the distance between the bottom of the lens surface and the top of the lens support arm 64 is a fixed, known distance for all lenses accommodated by the analyzing device.

Once the distance of the lens surface from the pivot axis is adjusted to be equal to the radius of curvature of the surface, the lens can be pivoted about the pivot axis 44 to enable the entire surface along a diametric line to be viewed and examined within the radiuscope, while maintaining the image of the surface in focus. Furthermore, by rotating the lens support block 68 in the support arm 64, it is possible to examine the entire curved surface of the lens without the need to readjust or focus the scope each time the position of the lens is changed.

In addition, the changing rate of curvature of aspheric lenses can be easily measured with this analyzer. For example, by moving the rotatable plate 42 to the next detent stop and moving the second Z axis slide to bring the fringe pattern into focus, the change in radius of curvature for every 10 degrees along the lens surface can be checked on the calibration scale of the second Z axis slide 62. The analyzer also facilitates observation of the peripheral curve and edge radius of a lens.

Furthermore, it is possible to easily measure the outside diameter of a lens with the analyzer. To carry this measurement out, one or both of the X-axis and Y-axis stages 14 and 26 is calibrated, for example by including a micrometer thereon. The lens is moved in a horizontal plane by adjusting the calibrated stage until one edge of the lens lines up with cross-hairs observable within the scope. A reading of the micrometer for the stage is taken, and then it is adjusted until the opposite edge of the lens lines up with the cross-hairs. The reading of the micrometer at this point provides an indication of the lens diameter.

In the example illustrated in FIG. 4, the lens is positioned below the pivot axis 44 since a concave surface is to be analyzed. Of course, it will be appreciated that the lens surface should be positioned above the pivot axis when a convex surface, such as the power curve on a lens, is to be analyzed, as illustrated in phantom in the Figure. The second Z axis slide 62 facilitates such positioning of the lens surface.

From the foregoing, it will be appreciated that the present invention provides a novel apparatus for use in conjuntion with a radiuscope to enable the entire surface of a lens to be examined without the need for refocusing the scope. In particular, the provision of a second Z axis slide that permits variation of the spacing between the curved surface and a pivot point allows lenses having a wide variety of curvature radii to be accommodated. Furthermore, the first Z axis slide makes the measurement of the radius of curvature much easier by permitting the operator to adjust the position of the lens so that the focused image of the fringe pattern appears at a suitable, operator determinable, reference point. This feature eliminates the need for subtraction of numbers having plural significant digits, which can lead to possible error.

It will be appreciated that the present invention can be embodied in other specific forms without departing from the spirit or essential characteristics thereof. The presently disclosed embodiment is therefore considered in all respects as illustrative and not restrictive. The scope of the invention is indicated by the appended claims rather than the foregoing description, and all changes which come within the meaning and range of equivalency of the claims are therefore intended to be embraced therein.

What is claimed is:

1. An apparatus for positioning the curved surface of a lens relative to a lens examining device to facilitate inspection of the entire lens surface, comprising:
    a support base;
    a first slide for providing linear translation along a vertical axis relative to said support base;
    a support member affixed to said first slide so as to be rotatable relative to said slide about a horizontal pivot axis;
    a second slide mounted on said support member and providing linear translation along a normally vertical axis perpendicular to said horizontal pivot axis; and
    a lens support structure mounted on said second slide, the distance between said lens support structure and said horizontal pivot axis being variable by means of movement of said second slide along its axis of translation in accordance with the radius of curvature of a lens to be inspected so that a portion of the lens surface is always maintained in a fixed focal area with rotation of said support member about said horizontal axis.

2. The apparatus of claim 1 further including means for providing linear translation of said first slide relative to said support base along two orthogonal horizontal axes.

3. The apparatus of claim 1 wherein said support member includes a series of detents in one surface thereof, and further including detent means for cooperating with said detents to fix the angular position of said support member relative to said first slide.

4. The apparatus of claim 3 wherein said detents are provided at 10° spacings on said support member, relative to said horizontal pivot axis.

5. An apparatus for enabling the entire curved surface of an object to be examined under a radiuscope without the need to refocus the radiuscope upon repositioning of the object, comprising:
    a support base;
    X- and Y-axis slides for providing horizontal movement along two orthogonal axes relative to said support base;
    a first Z-axis slide mounted on said X- and Y-axis slides for providing movement along a vertical axis;
    a bearing plate affixed to said first Z-axis slide;
    a pivot plate mounted on said bearing plate so as to be pivotable about a horizontal pivot axis;
    a second Z-axis slide mounted on said pivot plate for providing linear translation along an axis that is perpendicular to said pivot axis and that is rotatable about said pivot axis; and
    a cantilevered object support arm mounted on said second Z-axis slide such that the distance between said pivot axis and said support arm can be varied in accordance with the radius of curvature of the object to be examined.

* * * * *